(No Model.)

J. M. DODGE.
Drive Chain.

No. 237,499. Patented Feb. 8, 1881.

Witnesses:
Geo. H. Graham.
Jacob Felbel.

Inventor,
Jas. M. Dodge
by J. N. McIntire
Atty.

(No Model.)  2 Sheets—Sheet 2.

J. M. DODGE.
Drive Chain.

No. 237,499. Patented Feb. 8, 1881.

Witnesses:
Geo. H. Graham
Jacob Felbel

Inventor:
Jas. M. Dodge
By J. N. McIntire
Att'y.

N. PETERS, PHOTO-LITHOGRAPHER, WASHINGTON, D. C.

UNITED STATES PATENT OFFICE.

JAMES M. DODGE, OF CHICAGO, ILLINOIS, ASSIGNOR TO EWART MANUFACTURING COMPANY, OF SAME PLACE.

DRIVE-CHAIN.

SPECIFICATION forming part of Letters Patent No. 237,499, dated February 8, 1881.

Application filed December 3, 1880. (No model.)

*To all whom it may concern:*

Be it known that I, JAMES MAPES DODGE, of Chicago, in the county of Cook and State of Illinois, have invented certain new and useful Improvements in Drive-Chains; and I do hereby declare that the following is a full and exact description thereof, reference being had to the accompanying drawings, making part of this specification.

My invention relates to that kind of drive-chains the links of which are coupled together with an articulate joint, but capable of being uncoupled designedly. Previous to my invention this kind of chain has been made in two species—viz., that in which the detachable parts have been duplicates, (the coupling devices having been cast integral with the links,) and that in which alternate links and coupler devices (or connecting sections) have been employed. My invention belongs to the last-mentioned species, and has for its main object to provide this species of detachable chain with means for coupling and uncoupling the links without the necessity for any change of position of the links endwise of the chain, and consequently without the necessity for the existence of any slack in the chain.

To this main end and object my invention consists in the employment, in connection with the plain open links of a drive-chain, of a coupler composed of one or more helically-shaped devices adapted to surround the adjacent end bars of the links to be coupled, (when the parts are put together,) and to be screwed or turned on and off, all as will be hereinafter more fully explained.

To enable those skilled in the art to make and use drive-chains embodying my invention I will proceed to describe the latter more particularly by reference to the accompanying drawings, forming part of this specification, and in which I have illustrated a mode of carrying out my said invention in which I have practiced it, and which is the best mode now known to me.

Figure 1:
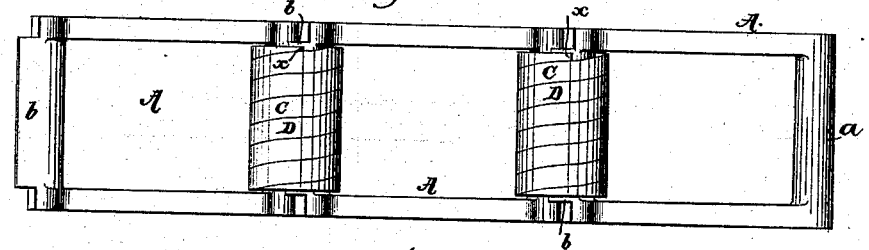
Figure 2:
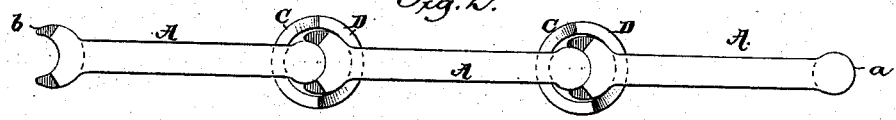
Figure 3:
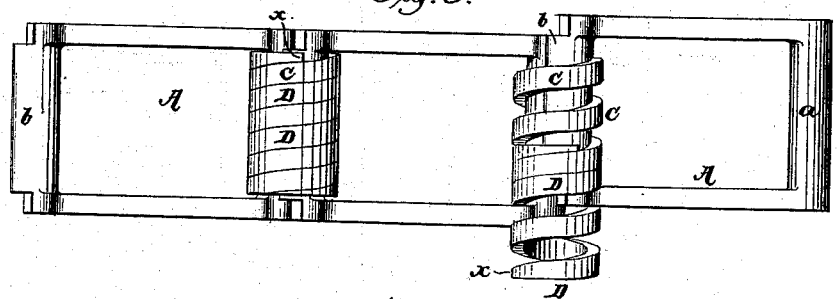
Figure 5:
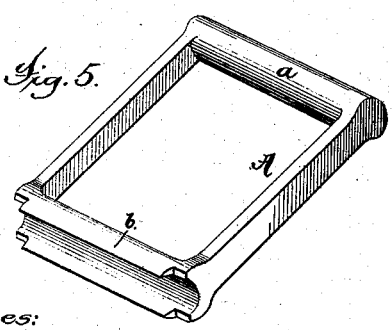
Figure 6:
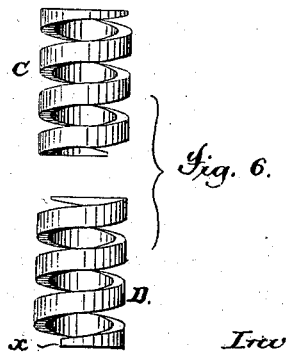
Figure 7:
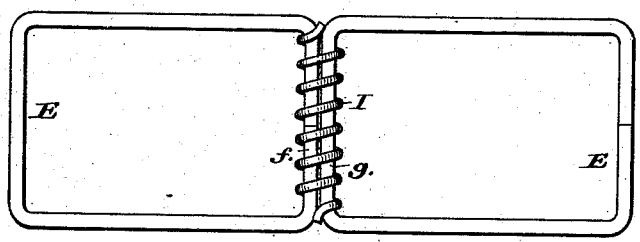
Figure 8:

In the said drawings, Figure 1 is a plan or face view; Fig. 2, an edge view; Fig. 3, a view similar to Fig. 1, but with the coupler devices of two links entirely removed and said two links moved slightly apart; Fig. 5, a perspective view of one of the links detached; and Fig. 6, detail view of the detached coupler devices of a chain embracing my invention; and in these several figures the same part (wherever it is visible in more than one figure) will be found designated by the same letter of reference.

At Figs. 7 to 11, inclusive, I have shown, respectively, in top view, vertical central section, top view with coupler partially removed, top view with coupler entirely removed and two links moved apart, and in detail, perspective of the coupler detached, another form of link and coupler composing a chain embodying my said invention, but under a modification adapted more particularly to chains the links of which are made of wire instead of being cast. In these figures (from 7 to 11 inclusive) the same part will also be found designated by the same letter of reference.

In Figs. 1 to 6, inclusive, A represent open rectangular links, which, by preference, are made in the form shown, so that one end bar, $a$, is about cylindrical, while the other, $b$, approximates the shape, in cross-section, of one-half of a hollow cylinder, in order that when arranged and coupled together in a working condition the adjacent end bars, $a$ and $b$, of the links may fit together and work, as clearly illustrated.

C and D are two helically-shaped coupler devices, which, when in place round about the end bars of the links, as shown at Fig. 1, constitute, practically, a hollow cylinder or sleeve, the bore of which is of just about sufficient capacity to accommodate and permit a free turning movement therein of the pair of coupled end bars, $a\ b$, of two links, and which sleeve surrounds said end bars, and is of a length such as to hold the coupled links in line by reason of their side bars shouldering against the ends of the said sleeve-like coupler, as clearly indicated in the drawings.

One of the helical devices—for instance, D—of each set has one end or point made blunt or cut off, as seen at $x$, whereby a slight depression in and shoulder on one end of the sleeve-like coupler are created, as shown, the purpose of which construction is to facilitate the necessary movements of the parts in the coupling and uncoupling operations.

The operation of the chain so far described may be thus explained: Assuming the parts to be coupled together and in working position, as seen at Fig. 1, to uncouple any two links—as, for instance, the middle link of the series, here shown from the link at the extreme right side of Fig. 1—it is only necessary to move the end link of the series sidewise slightly, as illustrated at Fig. 3, and to unscrew or turn off the device D, causing one of the side bars of the link thus moved sidewise to pass into the helical space of the spiral bar D, all as clearly illustrated at Fig. 3.

Figure 4:
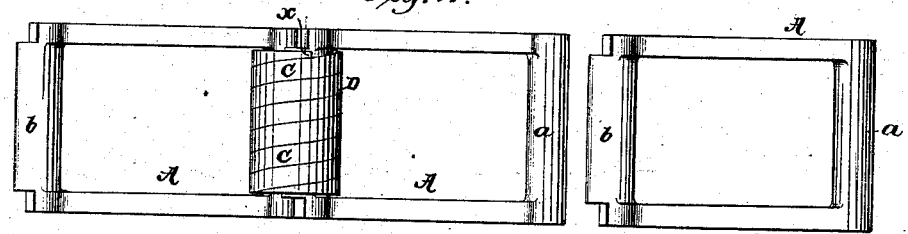

After the complete removal from the link's end bars of the device D its mate C may, of course, be removed by a twisting movement of it similar to that necessary for the removal of device D; and it will be observed that the removal thus of the two spiral devices C and D, to permit the detachment of the end bars $a$ and $b$, as shown at Fig. 4, does not necessitate any turning movement of any link, and consequently that the uncoupling and recoupling of any two links can be accomplished while the drive-chain may be in a perfectly taut condition—that is, without any slack. This capacity to be coupled and uncoupled without any slack (which is necessary to permit any hinge-like movement of two links) may, in some cases, constitute a very important advantage of my improved detachable chain.

Figure 9:
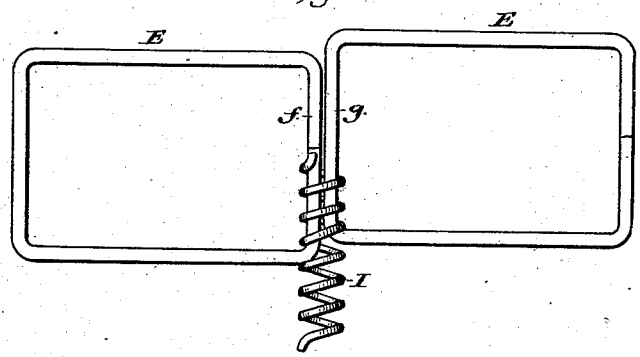
Figure 10:
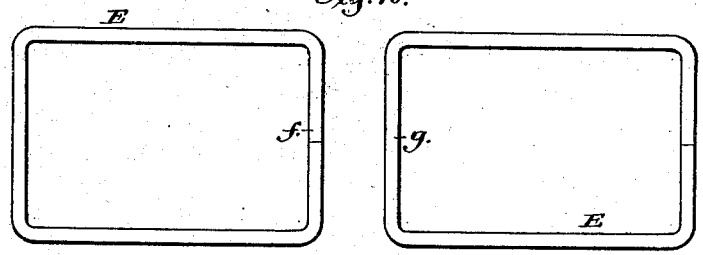

The chain shown in Figs. 7 to 11 inclusive is composed wholly of wire, each link being made, as shown, of a piece of wire, E, bent into rectangular contour, while each coupler I is composed simply of another piece of wire wound into the shape of a helix or screw-shaped device, the bore of which is sufficiently large to accommodate the coupled end bars, $f g$, of two adjacent links, and the pitch (or helical space) of which, as seen, is sufficient to permit the easy passage of the side bar of a link, in the manner shown at Fig. 9, to permit the ready extrication of the coupler device I.

In this modification of my invention, it will be seen, only one helical device being used to form the coupler, the uncoupling and recoupling of any two links may be effected with less trouble or more easily than in the case of the other form of chain shown, but in neither case is there any liability of any accidental uncoupling of the parts.

Figure 11:
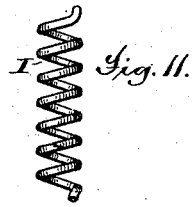

In the last-described form of chain it is desirable to give each end of the screw-coupler device I a slight sharp bend, as most clearly seen at Fig. 11. This may render the coupler less liable to any accidental coming off; but in both forms of chain shown as embodying my invention various changes of the details may, of course, be made without losing, in either case, the principle of construction and mode of operation peculiar to my invention; and said invention, it will be understood, may, of course, be carried out in other forms of chain and chain parts than those shown, so long as such other forms embody the said principle of construction and mode of operation.

The coupling together (or recoupling) of any of the links, by either of the couplers shown, (either the single or the double helical device,) is, of course, effected by operations the reverse of those described (as to the movements of the coupler devices) for uncoupling the links; and in the use of my invention in either form shown, the coupler device having necessarily a cylindrical bore, and being free to turn axially on the coupled devices, the frictional wear on the coupler device will naturally be distributed on its whole interior surface or bore.

Having now so fully explained my invention that those skilled in the art to which it appertains can understand it and make and use a chain containing it, what I claim as new, and desire to secure by Letters Patent, is—

1. The combination, with the two bars of chain-links, A, to be coupled together, of a spirally-shaped coupler device adapted to be readily turned onto and off from the said bars, in substantially the manner described, for the purposes set forth.

2. A drive-chain composed of suitably-shaped links and duplex spiral couplers, substantially as set forth.

3. A drive-chain composed of suitably-shaped links and spiral coupler devices, and having the end bars of the links adapted to fit one partially within a longitudinal concavity in the other, the whole substantially as set forth.

In witness whereof I have hereunto set my hand and seal this 27th day of October, 1880.

JAMES M. DODGE. [L. S.]

In presence of—
B. M. SAUNDERS,
S. HOWARD SMITH.